United States Patent [19]

Tappe et al.

[11] 4,374,640
[45] Feb. 22, 1983

[54] DYEING-STABLE MODIFICATION OF A DISPERSE DYESTUFF, PROCESSES FOR ITS PREPARATION AND USE

[75] Inventors: Horst Tappe, Dietzenbach; Hans Mayer; Klaus Hofmann, both of Frankfurt am Main, all of Fed. Rep. of Germany

[73] Assignee: Cassella Aktiengesellschaft, Frankfurt, Fed. Rep. of Germany

[21] Appl. No.: 362,976

[22] Filed: Mar. 29, 1982

[30] Foreign Application Priority Data

Jun. 26, 1981 [DE] Fed. Rep. of Germany ....... 3125159

[51] Int. Cl.³ .................. C09B 67/48; D06P 67/02
[52] U.S. Cl. ........................................ 8/526; 8/662; 8/696; 8/532; 260/156; 260/208
[58] Field of Search .................. 8/526, 662, 696; 260/208

[56] References Cited

U.S. PATENT DOCUMENTS

| | | | |
|---|---|---|---|
| 2,007,382 | 7/1935 | Ockman et al. | 8/526 |
| 3,957,749 | 5/1976 | von Brachel et al. | 260/156 |
| 4,074,965 | 2/1978 | Kruse et al. | 8/662 |
| 4,319,880 | 3/1982 | Opitz et al. | 8/526 |
| 4,327,999 | 5/1982 | Koller et al. | 8/526 |
| 4,332,588 | 6/1982 | Eusster et al. | 8/526 |

FOREIGN PATENT DOCUMENTS 40582 11/1981 European Pat. Off. .
1272043 4/1972 United Kingdom .

Primary Examiner—A. Lionel Clingman
Attorney, Agent, or Firm—Connolly and Hutz

[57] ABSTRACT

A dyestuff useful for dyeing and printing synthetic, hydrophobic fibers or mixtures thereof with cellulose fibers and stable under dyeing conditions is a β-modification of a compound of the formula

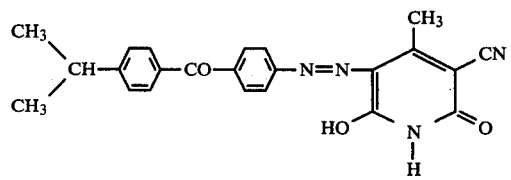

having an X-ray diffraction pattern under Cu-Kα-radiation with high intensity lines at a diffraction angle in θ degrees of 3.75, 6.40 and 12.35;

medium intensity lines at a diffraction angle in θ degrees of 6.60, 7.30, 7.60, 7.90, 8.10, 8.35, 9.30, 9.70, 9.90, 10.20, 10.50, 12.70 and 13.90;

and low intensity lines at a diffraction angle in θ degrees of 5.65, 8.75, 11.25, 11.70, 13.35, 15.10 and 15.55; which is prepared by heating at 50°–150° C. the α-modification of said compound, which is unstable under dyeing conditions.

10 Claims, 2 Drawing Figures

DYEING-STABLE MODIFICATION OF A DISPERSE DYESTUFF, PROCESSES FOR ITS PREPARATION AND USE

The invention relates to the dyeing-stable modification (β-modification) of the dyestuff of the formula I

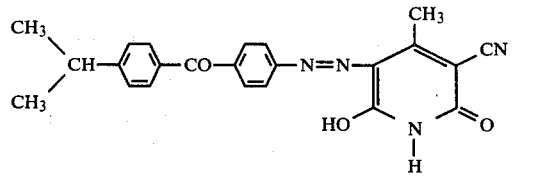

having an X-ray diffraction diagram (Cu-Kα-radiation) which has the following high intensity lines at a diffraction angle in θ degrees of 3.75, 6.40 and 12.35, medium intensity lines at a diffraction angle in θ degrees of 6.60, 7.30, 7.60, 7.90, 8.10, 8.35, 9.30, 9.70, 9.90, 10,20, 10.50, 12.70 and 13.90, and low intensity lines at a diffraction angle in θ degrees, of 5.65, 8.75, 11.25, 11.70, 13.35, 15.10 and 15.55.

The invention also relates to processes for the preparation of the dyeing-stable β-modification of the dyestuff I and its use for dyeing and printing synthetic, hydrophobic fibre material and mixtures of these fibre materials with cellulose fibres.

The dyestuff of the formula I is obtained, as described in German Offenlegungsschrift No. 2,001,821, by diazotising 4-amino-4'-isopropylbenzophenone in aqueous hydrochloric acid by means of sodium nitrite and then coupling the product to 3-cyano-4-methyl-6-hydroxy-2-pyridone. This reaction produces the dyeing-unstable α-modification, which does not have adequate stability under commercial dyeing conditions.

Figure 2:
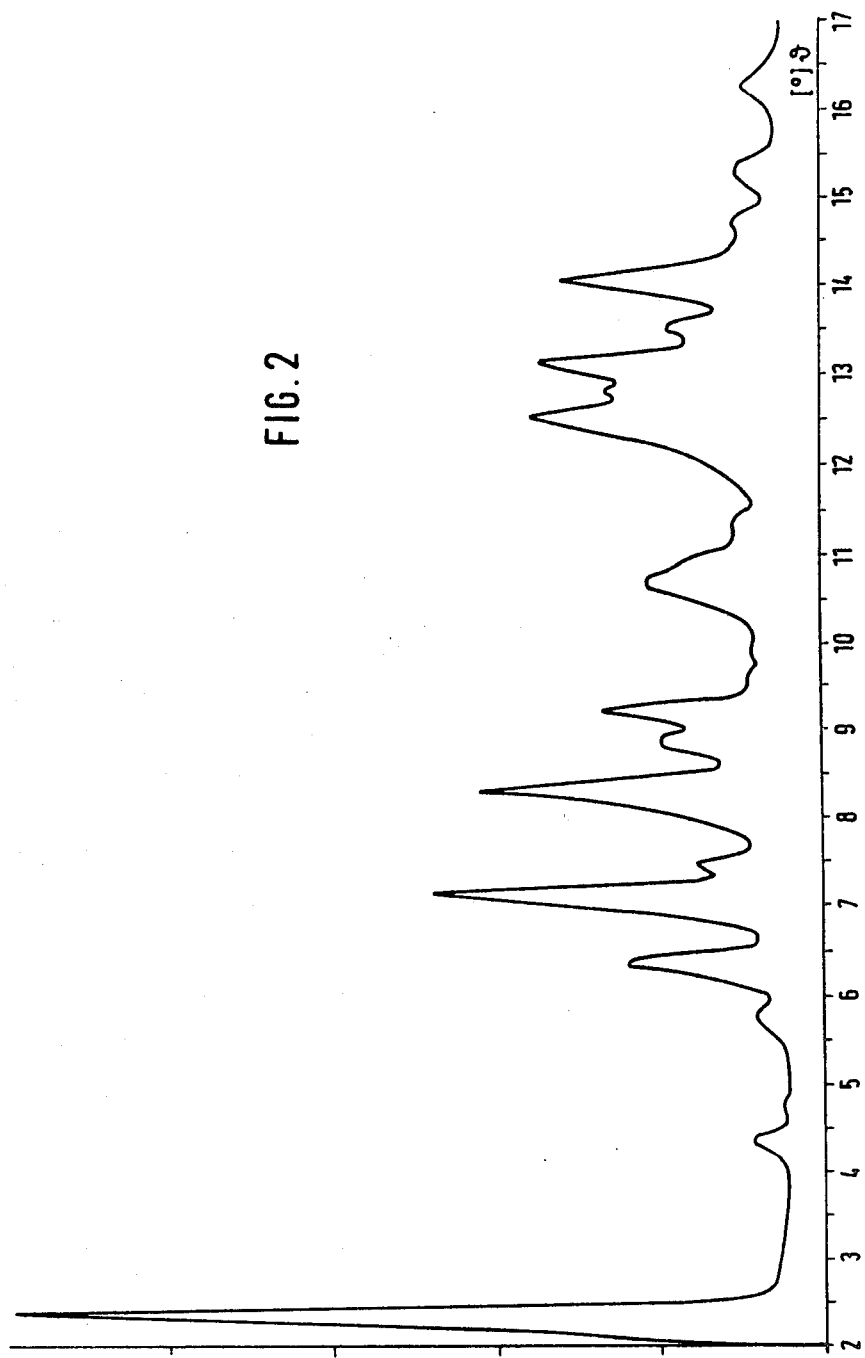
FIG. 2 shows the X-ray diffraction diagram of the unstable α-modification compound from which the dyestuff of this invention is prepared.

The dyeing-unstable α-modification has the X-ray diffraction diagram (Cu-Kα-radiation) shown in FIG. 2, which has a high intensity line at a diffraction angle in θ degrees of 2.35, medium intensity lines at a diffraction angle in θ degrees of 6.35, 7.10, 8.25, 9.15, 12.45, 13.10 and 14.05 and low intensity lines at a diffraction angle in θ degrees of 4.35, 5.75, 7.45, 8.85, 10.65, 10.75, 11.30, 12.75, 13.50 and 14.65, 15.25 and 16.20.

The dyeing-unstable α-modification of the dyestuff of the formula I is converted into the dyeing-stable β-modification by heating to temperatures of 50° to 150° C., preferably 80° to 140° C. and very particularly preferably 100° to 140° C. This heating can be carried out in various ways. As a rule, the dyeing-unstable α-modification is heated to the temperatures mentioned, advantageously while stirring, in an aqueous suspension or in a suspension of an organic solvent. It is advantageous to adjust the pH value of the aqueous suspension to 3 to 5, preferably 3.5 to 4.5. If appropriate, dispersing agents and/or emulsifiers and/or wetting agents and/or solvents are added to the suspension to be heated. On heating at temperatures which are above the boiling point of the liquid phase it is necessary to apply overpressure. The heating is carried out until the α-modification has been converted to the β-modification, which as a rule takes 1 to 15 hours. The conversion can be monitored by X-ray photography or by microscopy on samples which have been taken.

Examples of suitable dispersing agents are condensation products formed from naphthalenesulphonic acid and formaldehyde or from phenol and formaldehyde, lignosulphonates or sulphite pulp waste liquor or other anionic, cationic or nonionic surface-active compounds.

Examples of suitable solvents are ketones, such as methyl ethyl ketone, or alcohols, such as n-propanol, isopropanol and in particular ethanol.

The heating can also be carried out by recrystallising the dyeing-unstable α-modification from ethanol or from an ethanol/water mixture. The recrystallised dyestuff is then the dyeing-stable β-modification.

The heating can also be carried out in the course of a customary conversion of the dyestuff into a state of very fine division. In this conversion, the dyeing-unstable α-modification is converted into a finely divided form by wet-processing on customary devices, such as, for example, mills or kneaders, advantageously with the addition of dispersing agents and also, if appropriate, with other customary additives (such as anti-dusting agents, antifreezes, wetting agents, anti-drying agents and the like). Examples of suitable mills are ball mills, vibrating mills, bead mills and sand mills. On converting the dyestuff into a finely divided form at the temperatures mentioned, of 50° to 150° C., preferably 80° to 140° C. and very particularly preferably 100° to 140° C., this also effects a conversion of the dyeing-unstable α-modification of the dyestuff of the formula I into the dyeing-stable β-modification of the dyestuff of the formula I.

The dyeing-stable β-modification of the dyestuff of the formula I is also obtained on coupling diazotised 4-amino-4'-isopropylbenzophenone to 3-cyano-4-methyl-6-hydroxy-2-pyridone at temperatures of 30° to 80° C. in ethanol or in ethanol containing 10 to 90% by weight of water.

Figure 1:
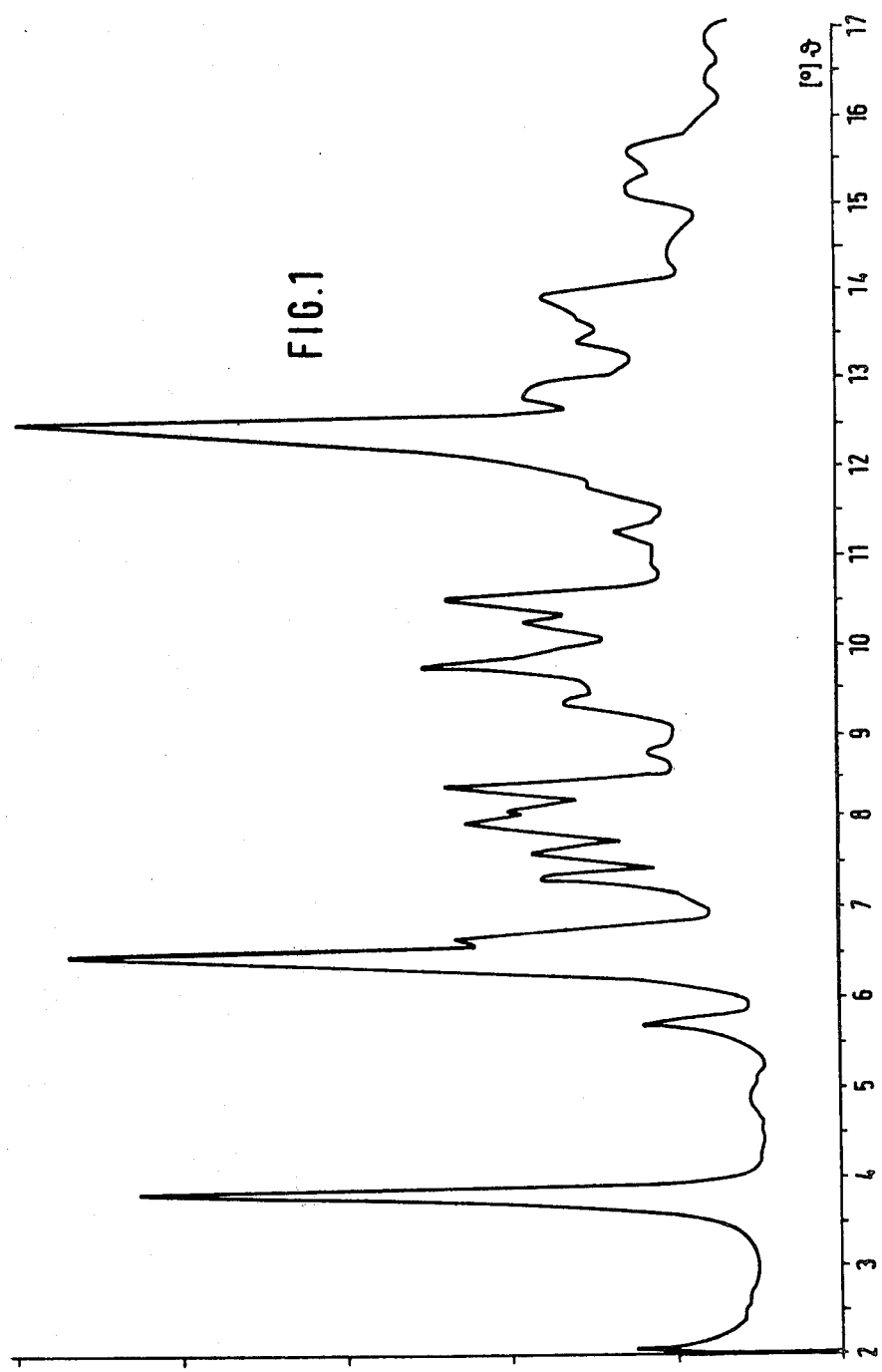
FIG. 1 shows the X-ray diffraction diagram of the dyestuff of this invention (β-modification).

The X-ray diffraction diagram of the dyeing-stable β-modification obtained with Cu-Kα-radiation is shown in FIG. 1. The X-ray diffraction diagrams were obtained by means of a computer-controlled Siemens D 500 powder diffractometer.

Unless the dyeing-stable β-modification of the dyestuff of the formula I was prepared in the course of a conversion into a very finely divided state at 80° to 140° C. and thus already in a state of very fine division, it is converted in a customary manner into a state of very fine division.

The dyeing-stable new β-modification of the dyestuff of the formula I converted into a state of very fine division is highly suitable for dyeing and printing synthetic, hydrophobic fibre material and mixtures of these fibre materials with cellulose fibres at temperatures of 100° to 220° C. Those hydrophobic fibre materials are preferred which consist of aromatic polyesters and cellulose esters, in particular polyesters. It produces on these by customary dyeing and printing processes intense yellow dyeings and prints having very good fastness properties, in particular very good fastness to light and to sublimation, very good build-up and very good thermomigration. The dyestuff in the β-modification has a good pH stability in the dye liquor and a very high Marks and Spencer fastness and an excellent levelling capacity. The new dyeing-stable β-modification does not have the disadvantages of the dyeing-unstable α- modification which in dyeing processes in which it is exposed to an elevated temperature for a relatively long period in an aqueous medium, possibly in the presence of auxiliaries, produces dyestuff precipitations and hence filtration phenomena. The dyeing-stable β-modification according to the invention is thus highly suitable for dyeing wound packages, in particular cross-wound cones.

In the examples below parts are parts by weight.

EXAMPLE 1

100 parts of the dyestuff of the formula I (dyeing-unstable α-modification) prepared in accordance with German Offenlegungschrift No. 2,001,821 from 4-amino-4'-isopropylbenzophenone and 3-cyano-4-methyl-6-hydroxy-2-pyridone are suspended in the form of a press cake in 200 parts of water and the pH is adjusted by means of acetic acid to 4. Stirring is then carried out for one hour at 130° C. under pressure. Afterwards the dyestuff had been converted from the dyeing-unstable α-modification into the dyeing-stable β-modification. The β-modification is filtered off and 233 parts of a modified lignosulphonate and 444 parts of water are added to it and the mixture is ground in a sand mill to a state of fine division of ≦1 μm. The dyestuff powder obtained after spray-drying satisfies all industrial requirements.

EXAMPLE 2

100 parts of the dyeing-unstable α-modification of the dyestuff of the formula I employed in Example 1, in a dried form, are recrystallised from 600 parts of ethanol. The recrystallised dyestuff is in the dyeing-stable β-modification.

The β-modification thus obtained is finished as indicated in Example 1 and it satisfies all commercial requirements.

EXAMPLE 3

500 parts of a modified lignosulphonate and 197 parts of water are added to 100 parts of the dyeing-unstable α-modification of the dyestuff of the formula I employed in Example 1 in the form of a press cake and the mixture is stirred for 2 hours at 120° C. under pressure. After cooling to 20° C., the mixture is ground in a sand mill to a state of fine division of ≦1 μm. A liquid dyestuff formulation is obtained which has perfect dyeing properties and a long shelf life.

What is claimed is:

1. A dyestuff stable under dyeing conditions and being the β-modification of a compound of the formula I

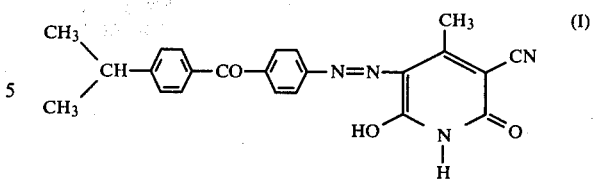

having an X-ray diffraction pattern under Cu-Kα-radiation with high intensity lines at a diffraction angle in θ degrees of 3.75, 6.40 and 12.35;

medium intensity lines at a diffraction angle in θ degrees of 6.60, 7.30, 7.60, 7.90, 8.10, 8.35, 9.30, 9.70, 9.90, 10.20, 10.50, 12.70 and 13.90;

and low intensity lines at a diffraction angle in θ degrees of 5.65, 8.75, 11.25, 11.70, 13.35, 15.10 and 15.55.

2. The process for preparation of a dyestuff stable under dyeing conditions and being the β-modification dyestuff according to claim 1 comprising heating at temperatures of 50° to 150° C. the α-modification of the compound of formula I which is unstable under dyeing conditions until coverted to the β-modification of the compound of formula I which is stable under dyeing conditions.

3. The process according to claim 2 wherein the α-modification compound is heated at temperatures of 80° to 140° C.

4. The process according to claim 3 wherein the α-modification compound is heated at temperatures of 100° to 140° C.

5. The process according to claim 2 wherein the α-modification compound is heated in an aqueous suspension.

6. The process according to either claim 2 or claim 5 wherein the α-modification compound is heated in the presence of a member selected from dispersing agents, emulsifiers, wetting agents, solvents, and mixtures thereof.

7. The process according to claim 2 wherein the α-modification compound is heated in the presence of ethanol.

8. The process according to claim 2 wherein the α-modification compound is converted into a finely divided state while heated.

9. The process for preparation of the stable β-modification dyestuff compound according to claim 1 comprising coupling diazotized 4-amino-4'-isopropylbenzophenone with 3-cyano-4-methyl-6-hydroxy-2-pyridone at temperatures of 30° to 80° C. in ethanol or aqueous ethanol containing 10 to 90% by weight of water.

10. In the process of dyeing and printing synthetic, hydrophobic fiber materials or mixtures of said fiber materials with cellulose fibers, with an azo-dyestuff, the improvement comprises said azo-dyestuff being the β-modification compound according to claim 1.

* * * * *